(12) United States Patent
Thornburgh et al.

(10) Patent No.: US 8,239,548 B2
(45) Date of Patent: Aug. 7, 2012

(54) ENDPOINT DISCRIMINATOR IN NETWORK TRANSPORT PROTOCOL STARTUP PACKETS

(75) Inventors: Michael C. Thornburgh, Santa Cruz, CA (US); Matthew Kaufman, Bonny Doon, CA (US)

(73) Assignee: Adobe Systems Incorporated, San Jose, CA (US)

( * ) Notice: Subject to any disclaimer, the term of this patent is extended or adjusted under 35 U.S.C. 154(b) by 968 days.

(21) Appl. No.: 11/779,165

(22) Filed: Jul. 17, 2007

(65) Prior Publication Data

US 2009/0024739 A1    Jan. 22, 2009

(51) Int. Cl.
    *G06F 15/16* (2006.01)
(52) U.S. Cl. ........................ 709/228; 709/225
(58) Field of Classification Search ............... 709/229, 709/225, 228
    See application file for complete search history.

(56) References Cited

U.S. PATENT DOCUMENTS

| | | | |
|---|---|---|---|
| 4,475,192 A | 10/1984 | Fernow et al. | |
| 5,774,660 A | 6/1998 | Brendel et al. | |
| 5,857,072 A | 1/1999 | Crowle | |
| 6,138,120 A | 10/2000 | Gongwer et al. | |
| 6,338,089 B1 | 1/2002 | Quinlan | |
| 6,563,793 B1 | 5/2003 | Golden et al. | |
| 7,039,916 B2 | 5/2006 | Jason, Jr. | |
| 7,111,162 B1 | 9/2006 | Bagepalli et al. | |
| 7,246,356 B1 | 7/2007 | Lozben et al. | |
| 7,274,706 B1 | 9/2007 | Nguyen et al. | |
| 7,305,486 B2 | 12/2007 | Ghose et al. | |
| 7,403,945 B2 | 7/2008 | Lin et al. | |
| 7,448,080 B2 | 11/2008 | Karjala et al. | |
| 7,600,113 B2 | 10/2009 | Kuehnel et al. | |
| 2002/0010783 A1* | 1/2002 | Primak et al. | 709/228 |
| 2002/0065912 A1 | 5/2002 | Catchpole et al. | |
| 2003/0135625 A1 | 7/2003 | Fontes et al. | |
| 2003/0163702 A1 | 8/2003 | Vigue et al. | |
| 2004/0064568 A1 | 4/2004 | Arora et al. | |
| 2004/0193461 A1 | 9/2004 | Keohane et al. | |
| 2004/0268142 A1 | 12/2004 | Karjala | |
| 2005/0097222 A1 | 5/2005 | Jiang et al. | |
| 2005/0198634 A1 | 9/2005 | Nielsen et al. | |
| 2006/0041745 A1 | 2/2006 | Parnes | |
| 2006/0047831 A1* | 3/2006 | Piper | 709/229 |
| 2006/0101081 A1 | 5/2006 | Lin et al. | |
| 2006/0215652 A1 | 9/2006 | Strandridge et al. | |
| 2006/0248195 A1* | 11/2006 | Toumura et al. | 709/226 |
| 2006/0256711 A1 | 11/2006 | Kusama et al. | |
| 2007/0086357 A1* | 4/2007 | Okmianski et al. | 370/254 |
| 2007/0234428 A1* | 10/2007 | Rash | 726/25 |
| 2008/0040226 A1* | 2/2008 | Roker | 705/14 |
| 2008/0075048 A1 | 3/2008 | Suszko | |
| 2008/0280623 A1 | 11/2008 | Danne et al. | |
| 2008/0301219 A1 | 12/2008 | Thornburgh et al. | |

(Continued)

OTHER PUBLICATIONS

Gupta. A client Oriented, IP level redirection Mechanism. IEEE. 1999. pp. 1461-1469.*

(Continued)

*Primary Examiner* — Joshua Joo
*Assistant Examiner* — Bryan Lee
(74) *Attorney, Agent, or Firm* — Fish & Richardson P.C.

(57) ABSTRACT

The subject matter disclosed herein relates to communication between a client and a server or between peers in a communications network. In one particular example, only a desired server from a plurality of servers addressable through a socket address may respond to a client request to initiate a session.

41 Claims, 5 Drawing Sheets

U.S. PATENT DOCUMENTS

| | | | |
|---|---|---|---|
| 2009/0150534 A1* | 6/2009 | Miller et al. | 709/223 |
| 2009/0164774 A1 | 6/2009 | Sherkin | |
| 2009/0249074 A1 | 10/2009 | Madhavan et al. | |
| 2009/0287826 A1 | 11/2009 | Kaufman et al. | |
| 2010/0015960 A1* | 1/2010 | Reber | 455/414.1 |

OTHER PUBLICATIONS http://en.wikipedia.org/wiki/Gnutella, May 5, 2008, 8 pages.

http://en.wikipedia.org/wiki/BitTorrent_%28protocol%29, May 5, 2008, 13 pages.

http://en.wikipedia.org/wiki/Kazaa, May 3, 2008, 7 pages.

Menezes et al., "Handbook of Applied Cryptography", CRC Press, 1996, pp. 321-383, 64 pages.

Patent Application, filed Feb. 20, 2008, for related U.S. Appl. No. 12/034,649, 29 pages.

Patent Application filed Jan. 3, 2008 for related U.S. Appl. No. 11/969,186, 22 pages.

International Search Report and Written Opinion mailed Oct. 28, 2008 in related matter PCT/US08/063739, 9 pages.

International Search Report and Written Opinion mailed Jun. 27, 2008 in related matter PCT/US2008/053865, 14 pages.

"Secure Hash Standard" Federal Information Processing Standards Publication 180-2, Aug. 1, 2002, pp. i-iii and 1-71.

Kaufman, Matthew, et al., "The Secure Media Flow Protocol—Version 1" Amicima, Inc., 2004, pp. 1-14.

U.S. Appl. No. 11/779,165, filed Jul. 17, 2007, Thornburgh et al.

http://en.wikipedia.org/wiki/BitTorrent_%28protocol%29, May 5, 2008, 13 pages.

Co-pending U.S. Appl. No. 11/757,126, filed Jun. 1, 2007.

Patent Application, filed Feb. 20, 2008, for related U.S. Appl. No. 12/034,649.

Patent Application filed Jan. 3, 2008 for related U.S. Appl. No. 11/969,186.

International Search Report and Written Opinion mailed Jun. 27, 2008 in related matter PCT/US2008/053865.

Office action mailed Jul. 2, 2009 in co-pending U.S. Appl. No. 11/757,126, 15 pages.

Response filed Sep. 28, 2009 in co-pending U.S. Appl. No. 11/757,126, 23 pages.

Examiner's Interview Summary mailed Oct. 9, 2009 in U.S. Appl. No. 11/757,126, 3 pages.

Final Office action mailed Oct. 26, 2009 in U.S. Appl. No. 11/757,126, 10 pages.

Office action mailed Nov. 3, 2009 for U.S. Appl. No. 11/969,186, 7 pages.

Housley, "Internet X.509 Public Key Infrastructure Certificate and Certificate Revocation List (CRL) Profile," Apr. 2002, downloaded from the internet at http://www.ietf.org/rfc/rfc3280.tx?number=3280 on Dec. 5, 2007, 127 pages.

International Standards Organization "ISO/IEC 9796-2 Information Technology, Security Techniques, Digital Signature Schemes, Giving Message Recovery," International Organization for Standards ISO/IEC 9796-2:2002/Amd.1:2008, Oct. 1, 2002 and Amendment of Jan. 15, 2008, 61 pages.

Rescorla, "Diffie-Hellman Key Agreement Method," Network Working Group, Request for Comments: 2631, Jun. 1999, downloaded from the internet at http://www.ietf.org/rfc/rfc263.txt on May 13, 2008, 13 pages.

RSA Security, Inc. "PKCS #1 v.2.1: RSA Cryptography Standard," downloaded from the internet at http://www.rsa.com/rsalabs/node.asp?id=2125 on May 13, 2008, 61 pages.

Cooper, D., et al., "Internet X.509 Public Key Infrastructure Certificate and Certificate Revocation List (CRL) Profile," Standards Track, Network Working Group, May 2008, 151 pages.

International Search Report and Written Opinion, mailed Jan. 28, 2010 in matter PCT/US08/063739, 7 pages.

International Search Report and Written Opinion, mailed Jun. 29, 2009 in matter PCT/US09/43824, 7 pages.

* cited by examiner

ENDPOINT DISCRIMINATOR IN NETWORK TRANSPORT PROTOCOL STARTUP PACKETS

BACKGROUND

1. Field

The subject matter disclosed herein relates to network communications protocols.

2. Information

To form a connection to a server capable of providing a service and/or resource, a client may first consult a Name Binding Service (for example, Internet Domain Name Service (DNS)) to learn potential endpoint addresses of the desired server. The client then transmits one or more initial startup packets (for example, TCP SYN, MFP Initial Hello, etc.) to those potential endpoint addresses for the desired server. The one or more initial startup packets contain no information about the desired identity of the server. A server at the one or more endpoint addresses, whether the server is the desired one or not, will respond with its responder initial startup packet (for example, TCP SYN ACK, MFP Responder Hello, etc.). Some communications protocols, such as Transmission Control Protocol (TCP), have no identifying information at the transport level beyond the socket address. Other protocols, such as Secure Media Flow Protocol (MFP), contain cryptographic credentials in the Responder Hello, which allow the client to determine if a responder has the desired identity and continue with session startup and communication. The server at the one or more endpoint addresses, whether the server is the desired one or not, must respond in order for the desired communications to take place. An attacker can use this behavior to scan for the presence of servers and/or services and their identities for later exploitation by enumerating and probing the relatively constrained socket address space.

To prevent unnecessary disclosure of the presence of servers at potential endpoint addresses and unnecessary consumption of network resources to convey irrelevant responses, potential servers should not respond if they are not the desired server.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
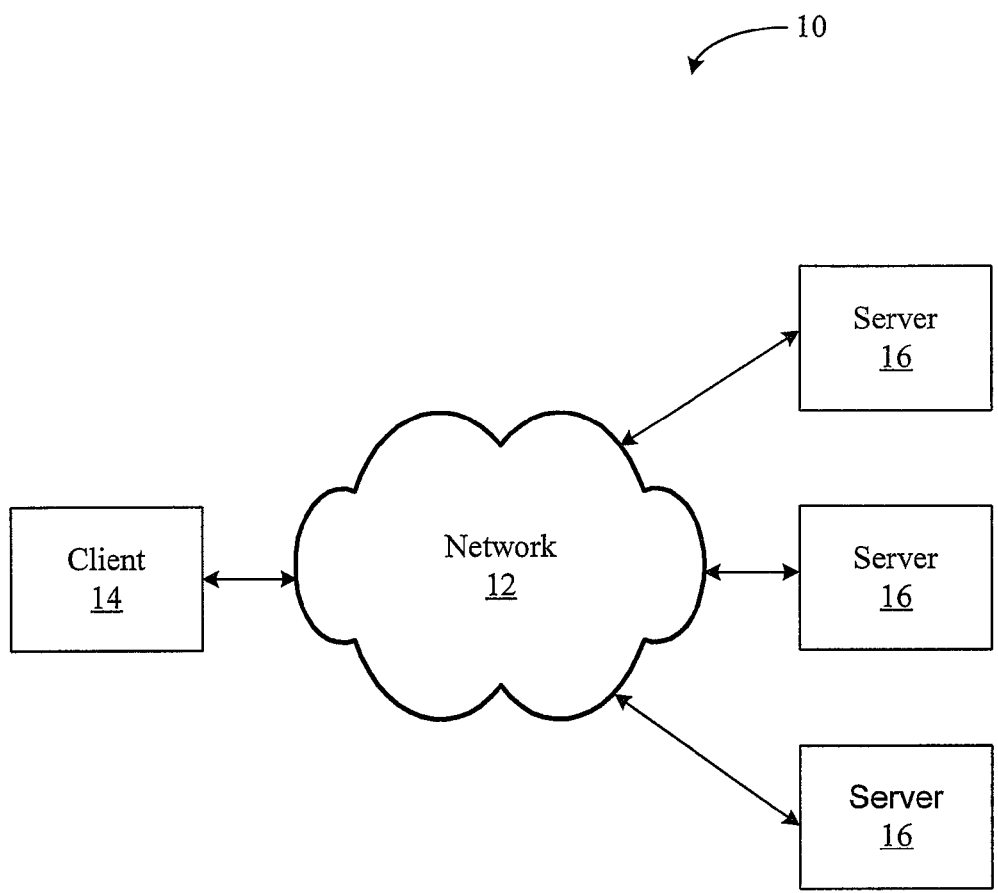
FIG. 1 is a schematic diagram of a network topology for transmitting information between clients and servers according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "identifying," "initiating," "obtaining," "hosting," "maintaining," "representing," "modifying," "receiving," "transmitting," "establishing," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium. Further, unless specifically stated otherwise, process described herein, with reference to flow diagrams or otherwise, may also be executed and/or controlled, in whole or in part, by such a computing platform.

A "computer program" as referred to herein relates to an organized list of instructions that, when executed, causes a computing platform and/or machine to behave in a predetermined manner. Here, for example, a computer program may comprise machine-readable instructions that are executable by a computing platform to perform one or more desired tasks. In one particular embodiment, although claimed subject matter is not limited in these respects, a computer program may define inputs and outputs such that execution of the program may provide outputs based, at least in part, on the inputs. However, these are merely examples of a computer program and claimed subject matter is not limited in these respects.

According to an embodiment, a computer program may comprise one or more "software components" comprising instructions that are executable as an integrated part of the computer program. Here, for example, computer program may comprise multiple software components that are individually created to perform associated functions of the computer program. The different components may then be integrated together to provide a functioning computer program. However, these are merely examples of a computer program and claimed subject matter is not limited in these respects.

An "application" as referred to herein relates to a computer program or group of computer programs capable of providing a desired result and/or action. In a particular embodiment, for example, such an application may comprise one or more computer programs that perform tasks in connection with providing a service and/or resource to a user. For example, although claimed subject matter is not limited in these respects, an application may comprise one or more end-user computer programs such as database programs, spreadsheets, word processors, computer programs that are accessible through a network browser, electronic mail, interactive games, video and/or image processing programs, media presentation programs, calendars, financial application software, inventory control systems and/or the like. However, these are merely examples of an application and claimed subject matter is not limited in these respects.

In one embodiment, a computing platform may comprise one or more "communication adapters" to enable communication between processes executing on the computing platform and a network. Such a communication adapter may comprise a device capable of transmitting information to and/or receiving information from a communication channel and/or data link. In one particular embodiment, for example, a communication adapter may be capable of transmitting information to and/or receiving information from a data transmission medium according to a predefined communication protocol. However, this is merely an example of a communication adapter and claimed subject matter is not limited in this respect.

A "network" as referred to herein relates to a plurality of devices capable of communicating through transmission of information over data transmission media. In a particular example, a network may transmit data between devices over data links according to one or more communication protocols. However, this is merely an example of a network according to a particular embodiment and claimed subject matter is not limited in this respect.

An "endpoint" as referred to herein relates to an entity on one end of a transport layer connection. In a particular example, an endpoint may comprise a client, a server, a peer device, a service, and/or a resource hosted on a computing platform. However, this is merely an example of an endpoint according to a particular embodiment and claimed subject matter is not limited in this respect.

An "endpoint discriminator" as referred to herein relates to information that identifies a particular endpoint among one or more endpoints associated with a transport layer connection. Such an endpoint discriminator may comprise, for example, a Uniform Resource Identifier (URI) such as a Uniform Resource Locator (URL), Uniform Resource Name (URN), domain name and/or the like comprising information identifying a particular resource and/or entity. Such information may comprise a string of characters, for example. Additionally, although not necessarily, such an endpoint discriminator may be independent of any particular network address, for example. In other alternative embodiments, an endpoint discriminator may be derived as a function of information identifying a particular resource and/or entity. Alternatively, an endpoint discriminator may also comprise a cryptographic identifier or a cryptographic hash function of any of the above (cryptographic identifier, URL, etc.) However, these are merely examples of an endpoint discriminator and claimed subject matter is not limited in this respect.

A "client" as referred to herein relates to a process that is capable of communicating with other processes through a network to perform one or more functions or tasks. For example, a client may comprise one or more application programs hosted on a computing platform capable of transmitting information to and/or receiving information from a network through a communication adapter. However, this is merely one example of an implementation of a client according to a particular embodiment and claimed subject matter is not limited in this respect.

A "server" as referred to herein relates to a process that is capable of providing a service and/or resource to other processes, such as clients, in communication with the server over a network. In one particular example, a server may comprise one or more application programs hosted on a computing platform capable of transmitting information to and/or receiving information from a network through a communication adapter. However, this is merely one example of an implementation of a server according to a particular embodiment and claimed subject matter is not limited in this respect.

A "session" as referred to herein relates to a period during which processes communicate over a network to perform one or more tasks, operations and/or functions. In one particular embodiment, a session may be established between a client and a server for the purpose of providing one or more resources and/or services to the client. For example, such a session between a client and server may be established for any one of several communication protocols (e.g., TCP/IP) for the transmission of datagrams and/or packets. In a particular embodiment, such a session may be established according to a particular communication protocol enabled by a network employing network, data link and physical layer protocols for transmission of information between processes according to associated addresses.

An "initial startup packet" as referred to herein relates to a packet capable of initiating a session between a client and an endpoint. In one particular embodiment, an initial startup packet may comprise a socket address and an endpoint discriminator. In TCP or UDP over IP, for example, a socket address may comprise a combination of an "IP address" and a "port number." Thus, a TCP or UDP packet may contain two socket addresses: a "source socket address" comprising a combination of the source IP address and the source port number, and a "destination socket address" comprising a combination of the destination IP address and destination port number.

FIG. 1 is a schematic diagram of a system 10 that is capable of establishing a session between a client 14 and one or more servers 16 over a network 12. Network 12 may employ data links (not shown) comprising one or more data transmission mediums such as, for example, cabling (e.g., fiber optic, twisted wire pair, coaxial), satellite transmission links or terrestrial wireless transmission links. However, these are merely examples of data transmission media that may be used for transmitting information in a network and claimed subject matter is not limited in this respect. Additionally, network 12 may employ one or more communication protocols for transmitting information between a source and a destination such as, for example, an Internet Protocol (IP), asynchronous transfer mode (ATM) and/or communication protocols adapted for use on wireless transmission links. However, these are merely examples of communication protocols that may be used for transmitting information between a source and a destination in a network and claimed subject matter is not limited in these respects. In particular embodiments, network 12 may comprise one or more network topologies and/or configurations such as, for example, one or more local area networks, one or more Intranets, the Internet, wireless carrier infrastructure Internet versus Intranet, and/or wireless carrier infrastructure, just to name a few examples. While particular examples provided herein establish a session between a client and server, it should be understood that such implementations are merely examples provided for the purpose of illustration and claimed subject matter is not limited to such implementations. For example, a session may also be established between peer devices and/or processes over network 12.

According to an embodiment, client 14 may comprise one or more processes hosted on a computing platform that is communicatively coupled to network 12 by a communication adapter (not shown). Similarly, servers 16 may comprise processes hosted on one or more computing platforms connected to network 12 by an associated communication adapter. In particular embodiments, each server 16 may be hosted on its own associated computing platform which is distinct from computing platforms hosting other servers 16. Alternatively, two or more servers may be hosted on a single computing platform.

According to an embodiment, client 14 may initiate a session with a server 16 to provide a service by, for example, establishing a session through which client 14 and server 16 may communicate over network 12. Client 14 may comprise any one of several application programs hosted on a computing platform such as, for example, email applications, web browsers, document processing programs, media players, and/or the like. Here, it should be understood that client 14 may be hosted and/or executed on any one of several devices capable of communicating with a network such as, for example, personal computers, mobile telephones, personal digital assistants, just to name a few examples. In particular embodiments, although claimed subject matter is not limited in this respect, a server may comprise a print server adapted to process print jobs, web server, email server, content server adapted to distribute audio or video content (e.g., through streaming). In a particular embodiment, servers 16 may be addressable through a single socket address. A socket address may comprise, for example, information combining an IP address and a UDP port number.

Figure 2:
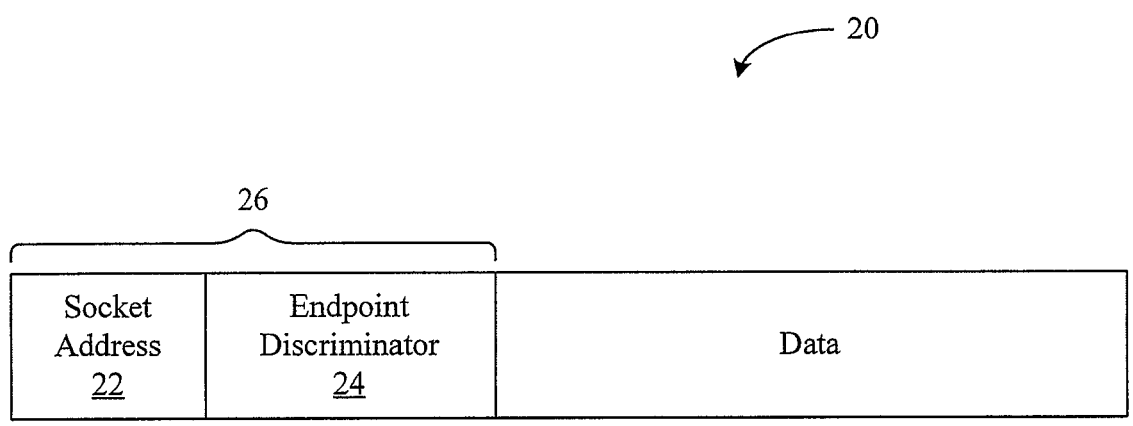
FIG. 2 is an example implementation of a data packet comprising an endpoint discriminator for identifying a server according to an embodiment.

FIG. 2 is a data packet 20 formatted according to a protocol such as, for example, an Internet Protocol for transmission from a source to a destination. According to an embodiment, a client may format data packet 20 as an initial startup packet to initiate a session with a server providing resources and/or services. In a particular example, such a data packet 20 may comprise a destination socket address 22 and an endpoint discriminator 24. In a particular embodiment, endpoint discriminator 24 may comprise information that identifies a particular desired endpoint such as a server. In a particular example, data packet 20 may comprise a header 26 including, for example, a source socket address identifying a source, such as a client, attempting to initiate a session with a destination, such as a server. While FIG. 2 shows that endpoint discriminator 24 is included in a header portion of data packet 20, in another example such an endpoint discriminator may be assigned to a separate field in a data packet. However, these are merely examples of an implementation of a data packet according to a particular embodiment and claimed subject matter is not limited in this respect.

As pointed out above, a server's identity may be represented by any one of several types of information such as, for example, a URL, URI, URN, domain name and/or the like. In one embodiment, an endpoint discriminator in an initial startup packet may comprise such information, allowing a recipient of the initial startup packet to readily associate the endpoint discriminator with an identity of an associated endpoint.

In an alternative embodiment, an endpoint discriminator associated with such a server may be derived and/or based, at least in part, from secure hash of such information. In a particular example, a client attempting to establish a session with such a server may hash information associated with an identity of the server according to a predetermined hash algorithm and include the computed hash as an endpoint discriminator in a data packet. In one particular embodiment, although claimed subject matter is not limited in this respect, a hash algorithm defined in Federal Information Processing Standard 180-2 "Secure Hash Standard" SHA-256, which takes input messages of any length and produces a cryptographic digest of 256 bits, may be employed. If such a particular algorithm is known to a recipient of an initial startup packet which includes such a computed endpoint discriminator, the recipient may interpret the endpoint discriminator to determine an identity of an associated endpoint.

Figure 3:
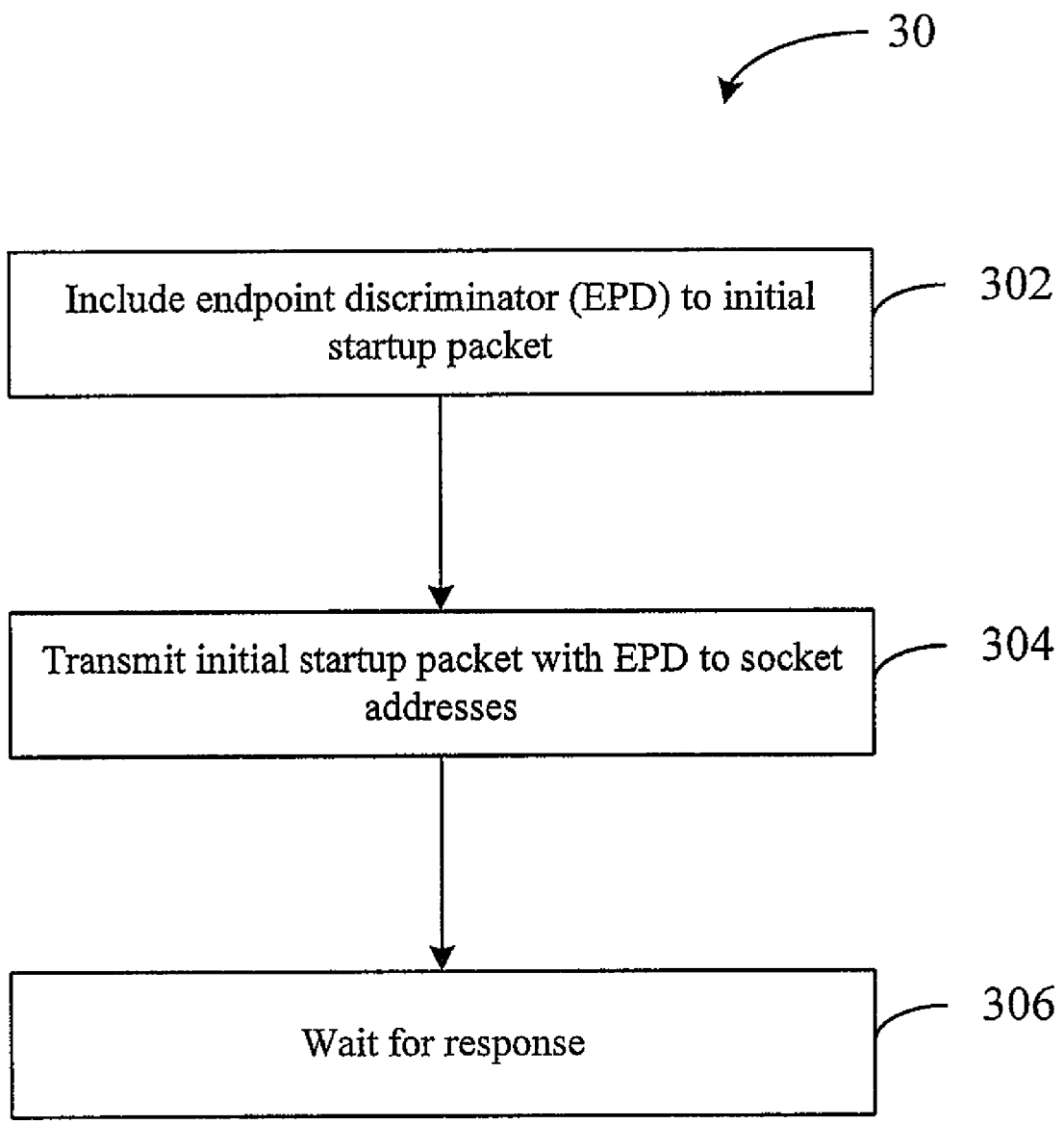
FIG. 3 is a flow diagram of a process associated with actions of a client initiating a session with a server according to an embodiment.
Figure 4:
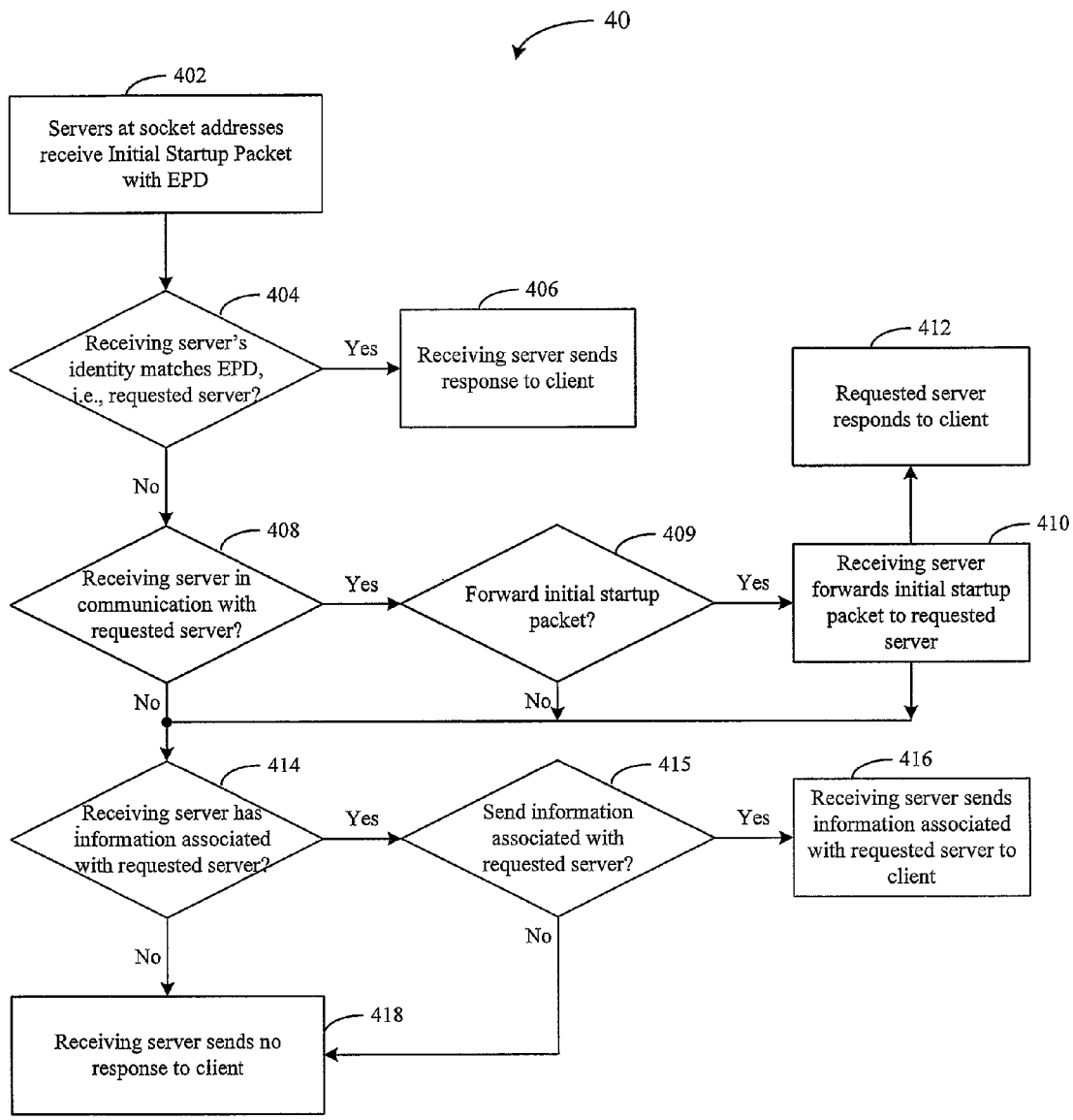
FIG. 4 is a flow diagram of a process associated with actions of a server for responding to messages from a client attempting to initiate a session.

FIG. 3 is a flow diagram of a process 300 associated with actions of a client initiating a session with a server according to an embodiment. FIG. 4 is a flow diagram of a process 400 associated with actions of a server for responding to messages from a client attempting to initiate a session. In one particular embodiment, although claimed subject matter is not limited in this respect, a client and servers may employ messages defined in the Secure Media Flow Protocol, Version 1.2, Dec. 14, 2005 (hereinafter "Media Flow Protocol" or "MFP"). As illustrated below, a client may employ MFP to establish a session with a server selected from two or more servers through an exchange of messages in datagrams transmitted through a network according to a User Datagram Protocol (UDP) (e.g., over Internet Protocol (IP) packets). While particular examples provided herein establish a session between a client and a server using the MFP, it should be understood that such implementations are merely examples of establishing a session between a client and a server provided for the purpose of illustration, and that claimed subject matter is not limited to such implementations.

At block 302, client 14 may include a destination socket address and an endpoint discriminator identifying a particular server to an initial startup packet for initiating a session with a desired server identified by the endpoint discriminator. In one particular embodiment, a destination socket address is not uniquely associated with a single server. Accordingly, a plurality of servers may be addressable through the same destination socket address, for example, through multiple URLs. At block 304, a client may transmit the initial startup packet including the endpoint discriminator according to the destination socket address. In one particular example, an initial startup packet transmitted at block 304 may comprise an "Initiator Hello" or "IHello" message defined according the aforementioned MFP, for example, with an endpoint discriminator identifying the desired server. Again, it should be understood that this is merely one example of how an initial startup packet including an endpoint discriminator may be transmitted to a server according to a protocol in a particular example and claimed subject matter is not limited in this respect. Here, one or more servers associated with the destination socket address may receive the initial startup packet transmitted at block 304. At block 306, a client may wait for a response to the initial startup packet transmitted at block 304 from a server that recognizes the endpoint discriminator. In one embodiment, a server associated with the endpoint discriminator may receive the initial startup packet at the destination socket address in the initial startup packet and send a response message to the client. In another embodiment, a server at the destination socket address in the initial startup packet may not be the desired server identified by the endpoint discriminator but may be in communication with the desired server. The server at the destination socket address may then transmit a forwarding message that may include, for example, the initial startup packet and the client address to the desired server. The desired server may then send a response message directly to the client. In another embodiment, a server at the destination socket address in the initial startup packet may not be the server identified by the endpoint discriminator but may have information such as, for example, the socket address associated with the identified server. The server at the destination socket address in the initial startup packet may then send a redirect message containing the socket address of the identified server to the client. The client may then initiate a session with the desired server at the identified socket address. In another embodiment, the client may not receive a response message to the initial startup packet. In a particular embodiment, a server at the destination socket address in the initial startup packet may not be the desired server identified by the endpoint discriminator and may not have any information related to the desired server. The server at the destination socket address in the initial startup packet may then discard the initial startup packet and perform no further processing.

FIG. 4 is a flow diagram of a process 400 hosted on a server which is responsive to an initial startup packet transmitted from a client (e.g., at block 304 in FIG. 3). For example, at block 402, one or more servers associated with a destination socket address may receive an initial startup packet from a client addressed according to a socket address and an endpoint discriminator associated with the server. At diamond 404, a receiving server at the destination socket address may determine whether its identity matches the endpoint discriminator in the received initial startup packet. At block 406, if the endpoint discriminator matches the identity of the receiving server, the receiving server may respond to the client. In a particular embodiment, the receiving server may transmit a response message formatted as a "Responder Hello" or "RHello" message defined according to the aforementioned MFP, for example, to the client. It should be understood that this is merely one example of how a response message may be formatted for transmission to a client in response to receipt of an initial startup packet according to a protocol in a particular example, and claimed subject matter is not limited in this respect. At diamond 408, if the endpoint discriminator does not match the identity of the receiving server, the receiving server may then determine, at diamond 414, whether the receiving server is in communication with the server identified by the endpoint discriminator. At diamond 409, a receiving server in communication with a desired server identified by the endpoint discriminator may or may not forward the initial startup packet to the identified server. In a particular example, the receiving server may be configured to not forward initial startup packets for security reasons. In another example, the receiving server may not forward the initial startup packet to the identified server if the receiving server has not been provisioned with sufficient capacity to provide that function. In yet another example, the receiving server may not have permission from the server identified by the endpoint discriminator to indicate its presence. If the receiving server does not forward the initial startup packet to the server identified by the endpoint discriminator, the receiving server may determine, at diamond 414, whether it has information associated with the server identified by the endpoint discriminator.

At block 410, if the receiving server is in communication with a desired server identified by the endpoint discriminator, the receiving server may forward the initial startup packet to the identified server. In a particular embodiment, the receiving server may transmit a forwarding message formatted as a "Forward Hello" or "FHello" message to the identified server. Such an "FHello" message may include, for example, an "IHELLO" message including the endpoint discriminator and the client address (e.g., extracted from a header of a received initial startup packet). It should be understood that this is merely one example of how a forwarding message may be formatted for transmission to another server in response to receipt of an initial startup packet according to a protocol in a particular example, and claimed subject matter is not limited in this respect. At block 412, a desired server identified by the endpoint discriminator may receive the "FHELLO" message from the receiving server and respond to the client. In a particular embodiment, the identified server may interpret the "FHELLO" message as if it were an "IHELLO" message with an endpoint discriminator from a client at a client address. The desired server may then format the response message as a "Responder Hello" or "RHello" message defined according the aforementioned MFP, for example. Again, it should be understood that this is merely one example of how a response message may be formatted for transmission to a client in response to receipt of an initial startup packet according to a protocol in a particular example, and claimed subject matter is not limited in this respect.

At the output of block 410, the receiving server may determine, at diamond 414, whether it has information associated with the server identified by the endpoint discriminator. At diamond 415, a receiving server that has information associated with the server identified by the endpoint discriminator may or may not transmit the associated information for the server identified by the endpoint discriminator. In a particular example, the receiving server may be configured to not respond for security reasons. In another example, the receiving server may not be provisioned with sufficient capacity to function as a redirector. In yet another example, the receiving server may not have permission from the server identified by the endpoint discriminator to indicate its presence.

At block 416, the receiving server may transmit information associated with the identified server to the client. In a particular embodiment, the receiving server may transmit a redirect message to the client. The redirect message may include, for example, the "IHELLO" message with the endpoint discriminator and the information related to the server identified by the endpoint discriminator (for example, the socket address of the identified server). Again, it should be understood that this is merely one example of how a responder redirect message may be formatted for transmission to a client in response to receipt of an initial startup packet according to a protocol in a particular example, and claimed subject matter is not limited in this respect.

At block 418, rather than respond to the received initial startup packet, a server may discard the received initial startup packet. No further processing may occur.

Figure 5:
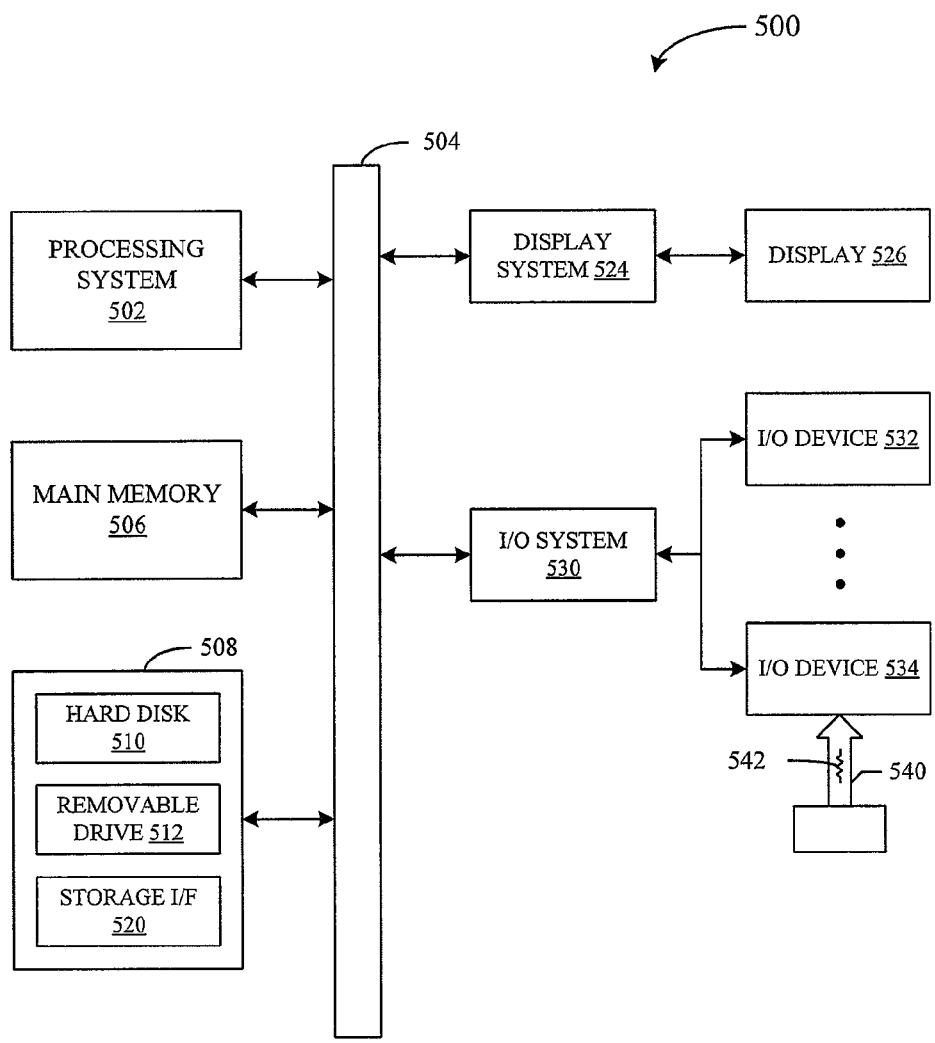
FIG. 5 is a schematic diagram of a computing platform that may host a server or client as illustrated above according to a particular embodiment.

FIG. 5 is a schematic diagram of a computing platform 500 that may host a server or client as illustrated above according to a particular embodiment. Computing platform 500 includes a processing system 502, which may include a central processing unit such as a microprocessor or microcontroller for executing programs to control tasks in the computing platform 500, thereby enabling features and function described above. Moreover, the processing system 502 may include one or more additional processors, which may be discrete processors or may be built in to the central processing unit.

Processing system 502 is coupled with a bus 504, which is adapted to transmit signals between processing system 502 and other devices. Computing platform 500 may include embedded controllers, such as, for example, Generic or Programmable Logic Devices or Arrays (PLD, PLA, GAL, PAL), Field Programmable Gate Arrays (FPGA), Application Specific Integrated Circuits (ASIC), single-chip computers, smart cards, or the like.

Computing platform 500 may include a main memory 506 and one or more cache memories, and may also include a secondary memory 508. These memories provide storage of machine-readable instructions and data for computer programs to be execute by processing system 502. Here, main memory 506 and secondary memory 508 may comprise one or more of the above identified storage media. In the particular illustrated implementation, secondary memory 508 may include, for example, a hard disk drive 510, a removable storage drive 512, and/or a storage interface 520.

Computing platform 500 may also include a display system 524 for connecting to a display device 526 and an input/output (I/O) system 530 (e.g., one or more controllers or adapters for providing interface functions) for connecting to one or more I/O devices 532, 534. I/O system 530 may provide a communications interface, which allows information to be transmitted, in the form of signals 542, to computing platform 500 and external devices, networks or information sources. Signals 542 may be transmitted in any type of transmission media (e.g., as electronic, electromagnetic or optical transmission media) to be received via a channel 540 (e.g., wire, cable, optical fiber, phone line, infrared (IR) channel, radio frequency (RF) channel, etc.). A communications interface used to receive these signals 542 may comprise a network interface controller designed for a particular type of network, protocol and/or transmission medium, and/or may be designed to serve multiple networks, protocols and/or channel media.

Machine-readable instructions may be stored in computing platform 500 and/or delivered to computing platform 500 over a communications interface. It should be understood that computing platform 500 is merely an example of a computing platform capable of hosting a client or a server and that other systems, architectures, and modifications and/or reconfigurations may also be used without deviating from claimed subject matter.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A method, comprising:
    transmitting at a computing platform an initial startup packet to an electronic communication network, the initial startup packet comprising a socket address and an endpoint discriminator associated with a requested endpoint from among a plurality of endpoints addressable through said socket address;
    receiving at said computing platform a redirect message from an endpoint among the plurality of endpoints subsequent to said endpoint among the plurality of endpoints determining whether said endpoint is in active communication with said requested endpoint, said redirect message comprising another socket address that identifies said requested endpoint; and
    receiving at said computing platform a response packet from said requested endpoint based, at least in part, on use of said another socket address.

2. The method of claim 1, wherein said endpoint discriminator comprises information associated with an identity of said requested endpoint.

3. The method of claim 2, further comprising determining said endpoint discriminator based, at least in part, on a cryptographic hash of said information associated with the identity of said requested endpoint.

4. The method of claim 1, wherein said endpoint discriminator is based, at least in part, on a Uniform Resource Identifier associated with said requested endpoint.

5. The method of claim 4, further comprising determining said endpoint discriminator based, at least in part, on a cryptographic hash of said Uniform Resource Identifier associated with said requested endpoint.

6. The method of claim 1, wherein said endpoint discriminator is based, at least in part, on a Uniform Resource Locator associated with said requested endpoint.

7. The method of claim 6, further comprising determining said endpoint discriminator based, at least in part, on a cryptographic hash of said Uniform Resource Locator associated with said requested endpoint.

8. The method of claim 1, wherein said endpoint discriminator is based, at least in part, on a Uniform Resource Name associated with said requested endpoint.

9. The method of claim 8, further comprising determining said endpoint discriminator based, at least in part, on a cryptographic hash function of said Uniform Resource Name associated with said requested endpoint.

10. The method of claim 1, wherein receiving said redirect message is in response to said endpoint among the plurality of endpoints determining whether or not to send a forwarding message to the requested endpoint based at least in part on whether said endpoint is in active communication with said requested endpoint.

11. The method of claim 10, wherein said forwarding message corresponds to the initial startup packet.

12. A method, comprising: receiving at a computing platform an initial startup packet from an electronic communication network, the initial startup packet comprising a socket address and an endpoint discriminator associated with a requested endpoint from among a plurality of endpoints addressable through said socket address;
    determining at said computing platform an identity of said requested endpoint based, at least in part, on said endpoint discriminator;
    determining whether said computing platform is in active communication with the requested endpoint, after determining the identity of said requested endpoint; and
    transmitting at said computing platform a redirect message to the network, said redirect message comprising another socket address identifying said requested endpoint, in response to determining whether said computing platform is in an active communication with the requested endpoint.

13. The method of claim 12, wherein determining whether said computing platform is in active communication with the requested endpoint is performed in response to determining that an identity of an endpoint does not match an identity of said requested endpoint.

14. The method of claim 13, further comprising:
transmitting a forwarding message to said requested endpoint, if the endpoint determines an active communication status with said requested endpoint.

15. The method of claim 14, wherein the requested endpoint responds to the initial startup packet responsive to the forwarding message.

16. The method of claim 15, wherein the forwarding message comprises the initial startup packet.

17. The method of claim 12 wherein said transmitting comprises: transmitting said redirect message to the network in response to an endpoint determining that said requested endpoint is not associated with the socket address of the initial startup packet.

18. The method of claim 12, wherein transmitting said redirect message is in response to said endpoint among the plurality of endpoints determining whether or not to send a forwarding message to the requested endpoint based at least in part on whether said endpoint is in active communication with said requested endpoint.

19. The method of claim 18, wherein said forwarding message corresponds to the initial startup packet.

20. An article, comprising:
a non-transitory storage medium comprising machine-readable instructions stored thereon which are executable by a computing platform to:
initiate transmission of an initial startup packet to a network, the initial startup packet comprising a socket address and an endpoint discriminator associated with a requested endpoint from among a plurality of endpoints addressable through said socket address;
receive a redirect message from an endpoint among the plurality of endpoints subsequent to said endpoint among the plurality of endpoints determining whether said endpoint is in active communication with said requested endpoint, said redirect message comprising another socket address that identifies said requested endpoint; and
receiving at said computing platform a response packet from said requested endpoint based, at least in part, on use of said another socket address.

21. The article of claim 20, wherein said endpoint discriminator comprises information associated with an identity of said requested endpoint.

22. The article of claim 21, wherein said instructions are further executable by said computing platform to determine said endpoint discriminator based, at least in part, on a cryptographic hash of said information associated with the identity of said requested endpoint.

23. The article of claim 20, wherein said endpoint discriminator is based, at least in part, on a Uniform Resource Identifier associated with said requested endpoint.

24. The article of claim 20, wherein said endpoint discriminator is based, at least in part, on a Uniform Resource Locator associated with said requested endpoint.

25. The article of claim 20, wherein said endpoint discriminator is based, at least in part, on a Uniform Resource Name associated with said requested endpoint.

26. An article, comprising:
a non-transitory storage medium comprising machine-readable instructions stored thereon which are executable by a computing platform to:
process an initial startup packet received from a network, the initial startup packet comprising a socket address and an endpoint discriminator associated with a requested endpoint from among a plurality of endpoints addressable through said socket address;
determine an identity of said requested endpoint based, at least in part, on said endpoint discriminator;
determining whether said computing platform is in active communication with the requested endpoint, after determining the identity of said requested endpoint; and
initiate transmission of a redirect message to the network, said redirect message comprising another socket address identifying said requested endpoint, in response to determining whether said computing platform is in an active communication with the requested endpoint.

27. The article of claim 26, wherein said instructions are executable by said computing platform to determine whether said computing platform is in active communication with the requested endpoint in response to determining that an identity of an endpoint does not match an identity of said requested endpoint.

28. The article of claim 27, wherein said instructions are further executable by said computing platform to initiate transmission of a forwarding message to said requested endpoint, if the endpoint determines an active communication status with said requested endpoint.

29. The article of claim 28, wherein the requested endpoint responds to the initial startup packet responsive to the forwarding message.

30. The article of claim 29, wherein the forwarding message comprises the initial startup packet.

31. The article of claim 26, wherein said instructions are further executable by said computing platform to initiate transmission of said redirect message to the network in response to an endpoint determining that said requested endpoint is not associated with the socket address of the initial startup packet.

32. The article of claim 26, wherein said instructions are executable by said computing platform to transmit said redirect message is in response to said endpoint determining whether or not to send a forwarding message to the requested endpoint based at least in part on whether said endpoint is in active communication with said requested endpoint.

33. The article of claim 32, wherein said forwarding message corresponds to the initial startup packet.

34. A computing platform, said computing platform comprising:
a communication adapter configured to transmit information to and receive information from a network; and
a processing system coupled to said communication adapter, said processing system being programmed with instructions to:
process an initial startup packet received from the network, the initial startup packet comprising a socket address and an endpoint discriminator associated with a requested endpoint from among a plurality of endpoints addressable through said socket address;
determine an identity of said requested endpoint based, at least in part, on said endpoint discriminator;
determining whether said computing platform is in active communication with the requested endpoint, after determining the identity of said requested endpoint; and
initiate transmission of a redirect message to the network, said redirect message comprising another socket address identifying said requested endpoint, in response to determining whether said computing platform is in an active communication with the requested endpoint.

35. The computing platform of claim 34, wherein said processing system is programmed with instructions to determine whether said computing platform is in active communication with the requested endpoint in response to determining that an identity of an endpoint does not match an identity of said requested endpoint.

36. The computing platform of claim 35, wherein said processing system is further programmed with instructions to initiate transmission of a forwarding message to said requested endpoint, if the endpoint determines an active communication status with said requested endpoint.

37. The computing platform of claim 36, wherein the requested endpoint responds to the initial startup packet responsive to the forwarding message.

38. The computing platform of claim 37, wherein the forwarding message comprises the initial startup packet.

39. The computing platform of claim 34, wherein said processing system is further programmed with instructions to initiate transmission of said redirect message to the network in response to an endpoint determining that said requested endpoint is not associated with the socket address of the initial startup packet.

40. The computing platform of claim 34, wherein said processing system is programmed with instructions to transmit said redirect message is in response to an endpoint determining whether or not to send a forwarding message to the requested endpoint based at least in part on whether said endpoint is in active communication with said requested endpoint.

41. The computing platform of claim 40, wherein said forwarding message corresponds to the initial startup packet.

* * * * *